June 13, 1961  L. O. KITTLE ET AL  2,987,742
BRUSH HAVING FOAM RUBBER MASSAGE AND POLISHING PAD THEREFOR
Filed Feb. 7, 1955
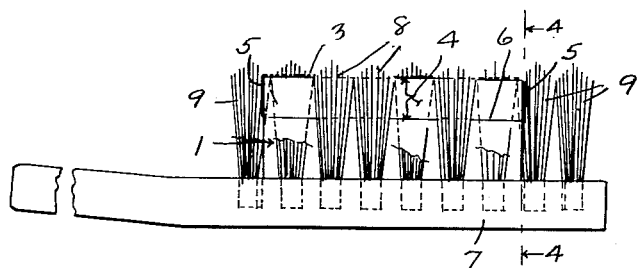
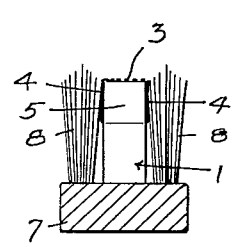
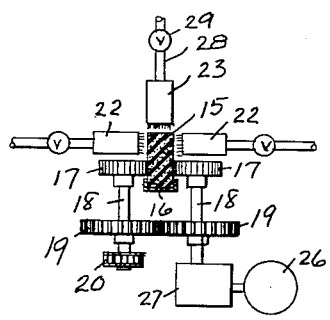
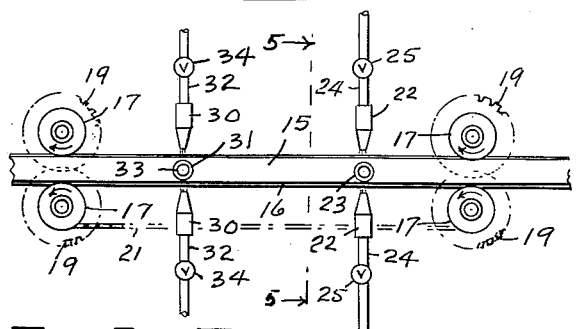
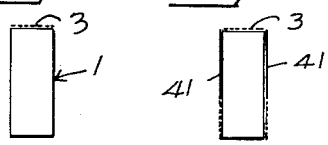
INVENTORS
LEVI O. KITTLE
BY IRENE T. KITTLE
Boyken, Mohler & Wood
ATTORNEYS United States Patent Office 2,987,742
Patented June 13, 1961

2,987,742
BRUSH HAVING FOAM RUBBER MASSAGE AND POLISHING PAD THEREFOR
Levi O. Kittle and Irene T. Kittle, both of 2686 W. 9th St., Los Angeles, Calif.
Filed Feb. 7, 1955, Ser. No. 486,552
8 Claims. (Cl. 15—114)

This invention relates to a brush, an example of which is the toothbrush disclosed in United States Letters Patent No. 2,702,914, issued March 1, 1955 in which a foam rubber massaging and polishing pad is used.

Foam rubber made in the conventional manner, comprises a body of intercommunicating cells, and such a body is highly moisture absorbent, although the material itself is not. Such a body may be in the form of a sheet, or block or may be molded or cast in the desired form or shape, and in making foam rubber a smooth outer surface or skin is usually produced. This outer skin surface, while more resistant to tearing or to breaking up when rubbed against another surface, as in a cleaning and polishing operation, is still rather fragile. Also, said outer surface may have a considerable number or all of the outer cells sealed off and closed, thus reducing the capacity of the material at the surface to pass liquid through the outer cells to the interior of the body and vice versa.

Another characteristic of foam rubber is that molded or otherwise formed and cured sheets or blocks are not of uniform thickness or of accurately predictable thickness, hence, where, as in the case of an invention such as is shown in said application, it is necessary that the dimensions be exact, the sheets or blocks must be cut to the desired dimensions. This, of course, results in the removal of at least one of the smooth and somewhat stronger outer skin surfaces and exposes the more delicate inner cells.

In a brush, such as above mentioned, it is desirable that the foam rubber pads have one or more of their outer surfaces toughened, and, for example, where the outer tooth polishing surface is toughened said toughened tooth polishing surface must readily admit water therethrough to the interior of the pad and vice versa. Also the pads must be of uniform and accurate size.

One of the objects of the present invention is the provision of a foam rubber product or body having a flexible, resilient, porous outer surface that is much tougher than any other such surface heretofore formed on foam rubber.

Another object of the invention is the provision of a foam rubber product having a plurality of greatly toughened outer surfaces that vary in their porosity and consequently in their capacity to pass moisture therethrough to the interior cells, from a moisture impervious surface to one that is about as readily capable of passing water therethrough as a cut and untreated surface.

A still further object of the invention is the provision of a toothbrush having a foam rubber pad secured to the head and between rows of tufts of bristles on said head and which pad has a toughened tooth engaging surface and substantially impervious oppositely outwardly directed side wall surfaces adjacent to said rows terminating at a distance spaced from said head, with the remainders of said side wall surfaces that are adjacent to said head being of a character to freely pass water therethrough from the interior cells in said pad outwardly, and vice versa.

Other objects and advantages will appear in the description and in the drawings.

In the drawings, FIG. 1 is a side elevational view of an untreated foam rubber body and FIG. 2 is an end view of FIG. 1.

FIG. 3 is an enlarged side elevational view of the head of a toothbrush, with some of the tufts of bristles on the near side broken away to show a foam rubber pad, made in accordance with this invention, secured to said head.

FIG. 4 is a sectional view taken along line 4—4 of FIG. 3.

FIG. 5 is a semi-diagrammatic sectional view taken along line 5—5 of FIG. 6.

FIG. 6 is a semi-diagrammatic plan view illustrating a method of making the product of this invention.

FIG. 7 is a side elevational view of a body of foam rubber such as is seen in FIG. 1, but having a portion of its oppositely outwardly directed side surfaces and end surfaces and its top surface toughened.

FIG. 8 is an end view of a body of foam rubber, such as shown in FIG. 7, but not having latex on the ends of the body.

FIG. 9 is an end view in which portions of the sides and ends only of a body, such as shown in FIG. 1 are toughened, and FIG. 10 is a view similar to that of FIG. 9, but in which the top surface is also toughened, but none of the surfaces are rendered impervious to the passage of water.

FIG. 11 is a view similar to that of FIG. 2, but in which the top surface only is toughened, but not rendered impervious to the passage of water therethrough.

FIG. 12 is a view similar to that of FIG. 2 in which the entire oppositely outwardly facing sides are toughened and the top surface is toughened, but the top surface and part of the side surfaces permit passage of water or liquid therethrough.

In the description, the use of the term "foam rubber" is intended to include any product having physical characteristics that are similar to those of foam rubber and that have intercommunicating cells whereby the material will readily take up and hold a relatively large amount of a liquid.

In detail, foam rubber products, such as the body 1 of FIGS. 1, 2 are low in tensile strength and resistance to abrasion, but stand flexion and compression well. Where the outer surfaces result from cutting the foam rubber, the outer cells are particularly fragile and tear readily. For that reason, the use of foam rubber has been mostly restricted to places where it is subjected only to compressive tension, such as cushions, etc.

In the foam rubber pad or body 1 shown in FIGS. 3, 4, self drying latex in fluid form has been applied as at 3, to the upper tooth engaging surface of pad 1, and also latex has been applied at 4 to the oppositely outwardly facing sides of the body 1, and at 5 to the oppositely outwardly facing ends of the body.

This latex terminates at about a level 6 spaced above the head 7 of the brush, to which head the said body 1 is secured by any suitable means, such as cement.

In the drawings, where a coating is indicated in heavy, black, broken lines, this is intended to show that the latex does not fill or close the outer cells, but permits water to pass therethrough to the inner cells. In other words, the cell walls are coated with latex.

Where solid black lines are used, the latex substantially or wholly fills the outer cells making the outer layer impervious to the passage of water therethrough, or at least substantially impairing the ability of the outer cells to pass water therethrough.

As will later be explained, any degree of porosity can be obtained from complete imperviousness to a condition in which there is little if any impairment of the capacity of the outer cells to pass water or a liquid therethrough.

In any event, there is little or no building up of the thickness of the material when the latex is properly applied, particularly where only the cell walls are coated without filling them.

The latex itself may be, natural, synthetic, or a combination thereof. It is normally water bearing in that it carries water and will mix with water, but strictly speaking, will not dissolve in water. When dry, said latex will not mix with water and is resistant to the action of most chemicals.

Referring to the drawings again, a row of tufts 8 of bristles is secured to head 7 along each of the two opposite sides of said body 1 and tufts 9 may also be secured to said head at the ends of the said body 1.

The latex 3 that is on the upper surface of the body, and that is adapted to engage the teeth in a brushing and polishing operation, is substantially only on the cell walls of said surface, leaving them free to pass moisture to the interior cells, and the latex 4 and 5 respectively on the sides and ends of body 1 may be more or less impervious to the passage of moisture to the interior of the body 1.

The latex 3, 4 and 5 when dried, so effectively toughens the outer surfaces of the body of foam rubber to which it is bonded that it is quite difficult to tear the outer cells by stretching, twisting, rubbing or otherwise manipulating the coated portions, and yet they remain flexible and relatively soft. This added toughness enables foam rubber to be used in places where its durability would otherwise be materially reduced.

In use on a toothbrush as illustrated in FIGS. 3, 4 where the latex 3 is only on the cell walls, and does not fill nor prevent rapid absorption of water by the body through the surface to which the latex 3 is applied, all of the desired characteristics for a polishing surface are retained. Thus, water applied to the top surface of the body 1 readily passes through it and enters the body and the upwardly opening cells of said top surface provide a surface that readily holds the desired abrasive or tooth cleaning and polishing material thereon.

Latex 4 and 5 on the laterally outwardly facing surfaces of the body 1 at its sides and ends and which latex may entirely, or partially fill the outwardly opening surface cells from the upper surface to a level spaced above head 7 of the brush, thus providing a control over the expression of water from the body 1 when the latter is compressed by application of pressure on the surface 3. When the body is filled with water and such compression takes place, the water in said body will be expressed through the outer surface that has latex 3 thereon, and from the body 1 at the root of tufts 8, 9 and such expression of the moisture will be more forceable than were the water free to also pass through the portions of the surfaces covered by the latex 4, 5. This is a highly desirable result since the expression of water or liquid from the body 1 at the roots on bases of tufts 8 will forceably flush any solids and other material from the spaces between the tufts and from the head, while the expression of water through the outer upper surface of the body 1 will provide a desired and essential supply of water to the detergent and abrasive that is carried on said surface.

The ends of the body may or may not be coated with latex, and if the use of the body of foam rubber is such that all of its outer surfaces should be free to pass water therethrough, or any other desired combination than is shown in FIG. 1, it is obvious that such a structure can readily be produced and at the same time the outer surface of the body will be toughened. It is also clear that any substantial degree of porosity of the outer latex covered surface may be obtained according to the degree to which the outer cells are filled with the latex.

FIGS. 5, 6 semi-diagrammatically illustrate the method of producing the desired results.

Liquid, self hardening, and preferably water bearing latex is a common product commercially produced. The latex can be painted or sprayed onto any desired surface and will dry in the atmosphere. Such drying may be accelerated by any of the conventional ways such as air or vacuum drying or temperature regulation and the consistency of the latex may also be varied to suit the particular demands.

A strip 15 of foam rubber having a cross sectional contour similar to that of the body 1 in FIG. 2, is shown in FIGS. 5, 6 as being supported in a shallow channel guide 16 for movement longitudinally of the strip and channel. Pairs of rollers or rotary elements 17 are disposed at spaced points along the strip 15 with the rotary elements of each pair at opposite sides of the strip. These rotary elements have roughened or friction surfaces and upon rotation of the pairs in a direction so that the elements of each pair at opposite sides of the strip will rotate oppositely as indicated by the arrows in FIG. 6, the strip 15 will be moved longitudinally along channel 16 in one direction without any objectionable expansion or compression strains being placed on the strip between the two pairs of elements 17.

Shafts 18 may carry the elements 17 and a pair of corresponding gears 19 may connect the elements of each pair for effecting simultaneous rotation of said elements. Sprocket wheels 20 respectively on one of the shafts 18 of each pair are connected by a sprocket chain 21 so that the corresponding rotary elements 17 of the two pairs will rotate in the same direction to move the strip 15 along channel 16 without stretching the strip or compressing it longitudinally.

Along the path of travel of strip 15 and between the two pairs of rotary elements 17 are a pair of oppositely directed nozzles 22 adapted to spray latex onto the opposite sides of the strip to substantially the level 6 from the upper surface of the strip, and a third nozzle 23 is directed downwardly to spray latex against the top surface of the strip 15. Any suitable supply pipe lines 24 may connect nozzles 22 with a suitable source of liquid latex and valves 25 in said pipe lines 24 will control the amount of latex discharged onto the opposite sides of the strip 15. Since one of the shafts 18 (FIG. 5) is connected with a motor 26 through a conventional variable speed transmission box 27 the rate of speed of strip 15 may be varied.

A line 28 (FIG. 5) may connect nozzle 23 with a source of liquid latex, and a valve 29 in the line 28 will control the rate of discharge of latex from the nozzle 23. These nozzles 22, 23 may be of the ejection type in which the latex is atomized to a more or less degree, or the latex may be under direct pressure free from atomization. In any event, the latex discharged onto the strip 15 may fill or partially fill the outer cells or outer layer of the strip to the level indicated by line 6 (FIG. 3), or to any desired level.

Further along the path of travel of the strip and at a point where the latex is still fluid, is a pair of oppositely directed nozzles 30 (FIG. 6) that are adapted to eject air or gas against the opposite sides of the strip 15 and against the portion of the strip that is covered with latex. A third similar nozzle 31 is directed against the top surface of the strip. Pipe lines 32 are adapted to deliver air or gas under pressure to nozzles 30 and a similar line 33 is adapted to deliver air or gas under pressure to nozzle 31.

A valve 34 is in each of the lines 32, 33 for controlling the volume and velocity of air ejected from the nozzles or to shut off some or all of the nozzles.

Where any one or more of the nozzles 30, 31 are actuated, they will blow the latex in the cells against the cell walls leaving the latter open to passage of water through the cells from one to the other, and this layer of latex will greatly toughen the cell walls. The air will, of course, tend also to accelerate the drying of the latex. If no air or gas is blown against the applied latex, the outer cells may be completely or partially filled with latex. In any event, any desired porosity of the various surfaces can be obtained by regulation and arrangement of the valves and the rate of movement of the foam rubber past the valves.

In the present method it is important that the velocity of the air or gas that is discharged against the fluid latex be sufficient to spread it over the cell walls where the cells are to be left open. It is not sufficient that it merely tend to dry the latex. In fact, the latex will dry without the application of air or gas from the nozzles. The principal and important function of the air ejection nozzles when they are used is to spread the latex in a relatively thin film over the cell walls so that water or a liquid will readily pass through the cells on the surface that is toughened by the latex and will go into the cells within the body.

As already mentioned in the drawings, FIGS. 7 to 12 and in FIGS. 3, 4 the latex that is not blown into the cell walls sufficiently to leave the cells open is indicated in continuous heavy lines and where the latex is spread over the cell walls to leave the cells open, the latex is indicated by heavy broken lines.

The body 1 of FIG. 7 is that of FIG. 3 separate from the toothbrush.

In FIGS. 8, 9, 10, 11, 12 where the identical structure of FIGS. 3, 4 and 7 are indicated the same numbers are used. Thus in FIG. 8, the side surfaces of body 1 show latex 4, but no latex is on the ends 36 and top 37. Hence, moisture can freely enter and be expressed from all portions of the body 1 except where latex 4 covers the sides, and the latex 4 toughens the sides.

In FIG. 9 the top surface 37 has no latex but latex 4, 5 toughens the side and end surfaces.

In FIG. 10, latex 38 on the opposite sides occupies the same area as latex 4, but the latex 38 is blown into the cells to cover and toughen them in the same manner as latex 3 covers the top. Latex 40 also is on the ends and is spread so as not to obstruct the passage of moisture.

In FIG. 11, latex 3 is used on the top surface only and in FIG. 12 latex 41 completely covers the sides leaving the ends free from latex and a coating 3 covers the top surface. The sides are partially porous as shown.

These various illustrations indicate that any desired combination can be obtained, and in each the cell walls at one or more sides are toughened and since latex is flexible, soft, and inseparably bonds with the foam rubber, the body produced is rendered usable for purposes heretofore found impossible due either to the fragile character of foam rubber or to the fact that the coating of the foam rubber in the normal manner by painting spraying or dipping, fills the outer cells and destroys the desirable characteristic of the foam rubber in passing moisture to the interior.

In tooth brushes, the various combinations shown in FIGS. 7 to 12 may be used, but preferably the latex, when impervious to the passage of a liquid, does not extend on the sides to the bottom. The form shown in FIGS. 3, 4 and 7 are the most desirable, but the others are preferable to use of the foam rubber without any toughening of any of the surfaces.

The drawings are intended to be illustrative of the product and method and are not intended to be restrictive of the invention to the precise forms shown and described.

We claim:

1. A rectangular pad of foam rubber having a base surface adapted to be secured to the bristle side of the head of a toothbrush and a tooth engaging surface opposite to said base surface for engaging the teeth of a person when said base surface is secured to said bristle side of said head, side surfaces on said pad extending between said base and tooth engaging surfaces, said base surface, tooth engaging surface and side surfaces having outwardly opening cells, the walls of the outwardly opening cells of said side surfaces along said tooth engaging surface being covered with a layer of latex of substantially uniform thickness inseparably bonded thereto thereby toughening said walls, the outwardly opening cells of said tooth engaging surface and said side surfaces along said base surface being open to permit passage of a liquid therethrough, and said latex also covering the cell walls only of said tooth engaging surface leaving the cells on said last mentioned surface open to passage of water therethrough into the body of said pad, said pad being horizontally elongated and relatively narrow in horizontal width relative to the vertical height of said pad, said tooth engaging surface being the uppermost surface and said base surface being the lowermost surface.

2. A pad of foam rubber having a base surface adapted to be secured to the bristle side of the head of a toothbrush and a tooth engaging surface opposite to said base surface for engaging the teeth of a person when said base surface is secured to said bristle side of said head, side surfaces on said pad extending between said base and said tooth engaging surfaces, latex substantially closing the cells of said side surfaces adjacent said tooth engaging surface to the passage of liquid therethrough, said pad being rectangular and horizontally elongated and relatively narrow in horizontal width to fit between a pair of longitudinally extending rows of bristle tufts on the head of a tooth brush with said tooth engaging surface adjacent to the outer freed ends of such tufts when said base surface is secured to said head between such rows and adjacent to the base ends of such tufts, said tooth engaging surface and the portion of said side surfaces along and adjacent to said base surface having outwardly opening cells for passage of water therethrough to and from the interior of said pad.

3. In a brush having a head and a pad of relatively soft, resilient, flexible material secured to one side of said head and projecting therefrom and having the characteristics of foam rubber in that it is formed of intercommunicating cells including outer layers opening outwardly at its outer exposed surfaces for passage of liquid through said outer layers to the interior of said pad, a coating of flexible, resilient, relatively soft, moisture impervious material covering certain predetermined portions only of said exposed surfaces and filling the cells at said surfaces whereby moisture within said pad will be expressed through the cells at the remainder of said surfaces upon compression of said pad, the said remainder of said surfaces including the surface of said pad facing away from said head, and a coating of said moisture impervious material covering the surfaces only of the walls of the cells of said last mentioned surface leaving said last mentioned cells open to passage of water therethrough to the interior of said pad.

4. In a toothbrush having a horizontally elongated head and a pair of spaced rows of tufts of bristles carried by said head extending longitudinally of the latter and projecting from one side of the latter, a horizontally elongated pad of foam rubber disposed between said rows and extending longitudinally thereof, said tufts having spaced base ends at said head and outer free ends remote from said head, said pad having a base surface secured to said head and having lateral surfaces facing said rows and an outer tooth engaging surface adjacent to the outer ends of said tufts, said outer surface comprising outwardly opening cells for admitting water into said pad through said cells and the lateral sides of said pad along said head also having outwardly opening cells for permitting water to pass therethrough from within said pad, a coating of latex covering the walls of the cells of said outer surface for toughening said walls, and said lateral sides being covered with latex along the portions thereof adjoining said outer surface and said portions being substantially in engagement with the said tufts adjacent to the outer ends of the latter.

5. In a toothbrush having a horizontally elongated head and a pair of spaced rows of tufts of bristles carried by said head extending longitudinally of the latter and projecting from one side of the latter, a horizontally elongated pad of foam rubber disposed between said rows and extending longitudinally thereof, said tufts having spaced base ends at said head and outer free ends remote from said head, said pad having a base surface secured to said head and having lateral surfaces facing said rows and an outer tooth engaging surface adjacent to the outer ends of said tufts, said outer surface comprising outwardly opening cells for admitting water into said pad through said cells and the lateral sides of said pad along said head also having outwardly opening cells for permitting water to pass therethrough from within said pad, a coating of latex covering the walls of the cells of said lateral sides along the portions thereof adjoining said outer surface, and the said portions being substantially in engagement with the said tufts adjacent to the outer ends of the latter.

6. An elongated pad of porous foam rubber having a base surface adapted to be secured to the bristle side of the head of a toothbrush, an upwardly directed tooth engaging surface extending from end to end and from side to side of said pad at the side thereof opposite to said base surface, opposite end surfaces at opposite ends of said pad and opposite side surfaces at opposite sides of said pad, said end surfaces extending fully between said base surface and said tooth engaging surface and between the ends of said side surfaces, and said side surfaces extending fully between said base surface and said tooth engaging surface and between the side edges of said opposite end surfaces, the cells of said pad defining said tooth engaging surface over substantially the full area thereof being open for absorption of liquid into the body of said pad through said surface and substantially the outermost cells only of said pad defining the portion of each of said side surfaces adjoining said tooth engaging surface from end to end of said pad being covered with latex and impervious to the passage of liquid therethrough, said tooth engaging surface being substantially planar and adapted to engage the surface of teeth over the full area within the upwardly projected confines of the outline of said pad.

7. An elongated pad of porous foam rubber having a base surface adapted to be secured to the bristle side of the head of a toothbrush, an upwardly directed tooth engaging surface extending from end to end and from side to side of said pad at the side thereof opposite to said base surface, opposite end surfaces at opposite ends of said pad and opposite side surfaces at opposite sides of said pad, said end surfaces extending fully between said base surface and said tooth engaging surface and between the ends of said side surfaces, and said side surfaces extending fully between said base surface and said tooth engaging surface and between the side edges of said opposite end surfaces, the cells of said pad defining said tooth engaging surface over substantially the full area thereof being open for absorption of liquid into the body of said pad through said surface and substantially the outermost cells only of said pad defining the portion of each of said side surfaces adjoining said tooth engaging surface from end to end of said pad being covered with latex and impervious to the passage of liquid therethrough said tooth engaging surface being substantially planar and adapted to engage the surface of teeth over the full area within the upwardly projected confines of the outline of said pad, and the cells defining said side surfaces along and adjoining said base surface being open to permit liquid absorbed by said pad through said tooth engaging surface to be expelled laterally from said pad along said base surface when the cells of said pad and said base surface are closed by such head of a toothbrush, upon squeezing said pad.

8. An elongated pad of porous foam rubber having a base surface adapted to be secured to the bristle side of the head of a toothbrush, an upwardly directed tooth engaging surface extending from end to end and from side to side of said pad at the side thereof opposite to said base surface, opposite end surfaces at opposite ends of said pad and opposite side surfaces at opposite sides of said pad, said end surfaces extending fully between said base surface and said tooth engaging surface and between the ends of said side surfaces, and said side surfaces extending fully between said base surface and said tooth engaging surface and between the side edges of said opposite end surfaces, the cells of said pad defining said tooth engaging surface being open for absorption of liquid into the body of said pad through said surface and the cells of said pad defining said side surfaces adjoining said tooth engaging surface from end to end of said pad being covered with latex and impervious to the passage of liquid therethrough said tooth engaging surface being substantially planar and adapted to engage the surface of teeth over the full area within the upwardly projected confines of the outline of said pad, and the cells defining said side surfaces along and adjoining said base surface being open to permit liquid absorbed by said pad through said tooth engaging surface to be expelled laterally from said pad along said base surface when the cells of said pad and said base surface are closed by such head of a toothbrush, upon squeezing said pad, the walls of said cells defining said tooth engaging surface being covered with latex for reinforcing said walls.

References Cited in the file of this patent

UNITED STATES PATENTS

| Number | Name | Date |
|---|---|---|
| 1,649,894 | Field | Nov. 22, 1927 |
| 1,823,797 | Finkel | Sept. 15, 1931 |
| 2,146,290 | Doyle | Feb. 7, 1939 |
| 2,257,911 | Kraft | Oct. 7, 1941 |
| 2,303,759 | Pippin | Dec. 1, 1942 |
| 2,354,430 | Greenup et al. | July 25, 1944 |
| 2,476,201 | Ligoure | July 12, 1949 |
| 2,596,565 | Kautenberg | May 13, 1952 |
| 2,600,136 | Staunt | June 10, 1952 |
| 2,622,044 | Martens | Dec. 16, 1952 |
| 2,711,977 | Butsch | June 28, 1955 |
| 2,715,745 | Jacobsen | Aug. 23, 1955 |
| 2,783,491 | Bellam | Mar. 5, 1957 |